April 14, 1953 W. H. BAGLEY 2,634,618
AUTOMOBILE ACCESSORY DRIVING ARRANGEMENT
Filed March 20, 1950
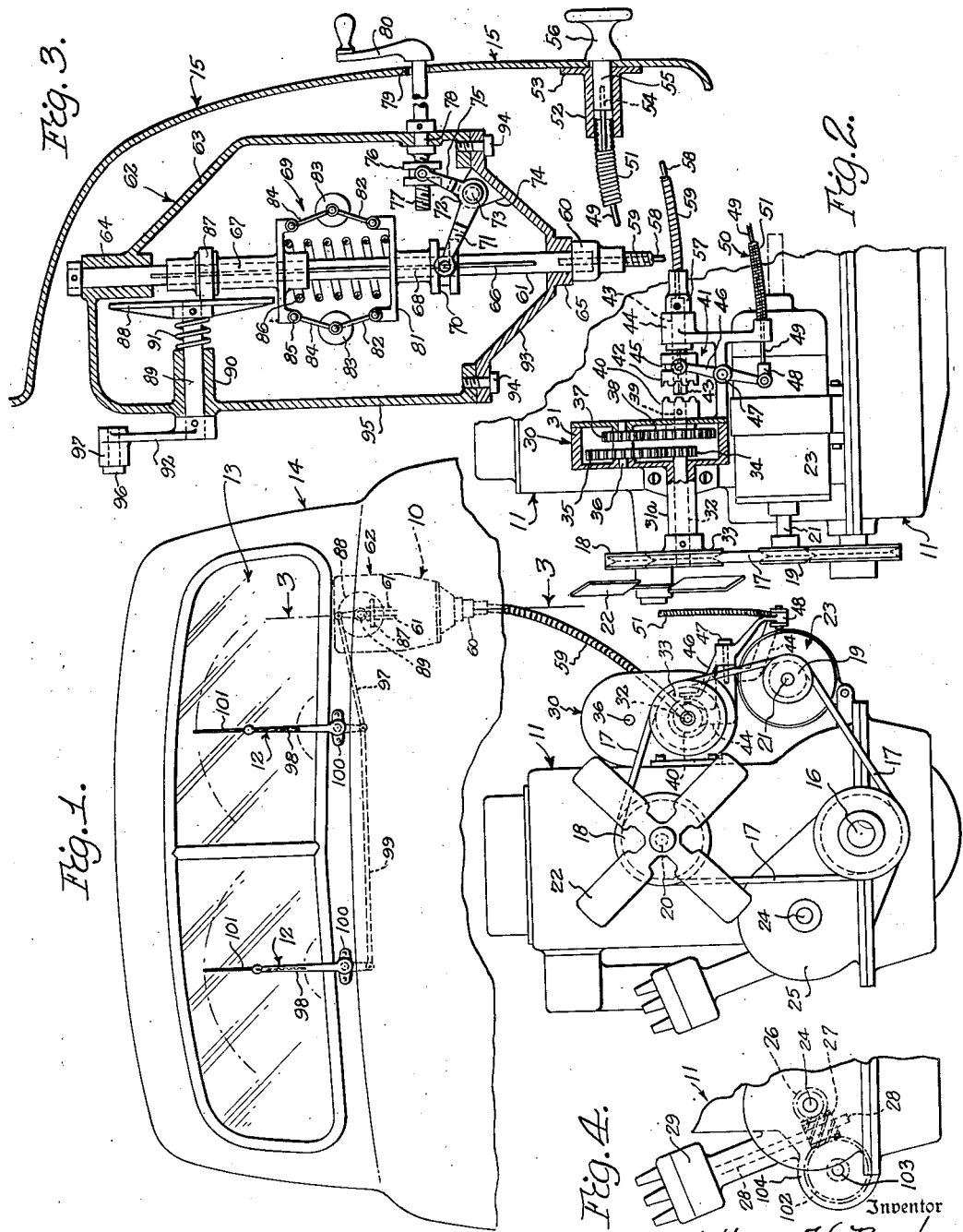
Inventor
William H. Bagley
Barthel & Bugbee
Attorneys Patented Apr. 14, 1953

2,634,618

UNITED STATES PATENT OFFICE 2,634,618

AUTOMOBILE ACCESSORY DRIVING ARRANGEMENT

William H. Bagley, Detroit, Mich.

Application March 20, 1950, Serial No. 150,750

4 Claims. (Cl. 74—190.5)

This invention relates to automobile accessories and, in particular, to driving arrangements for such accessories, for example windshield wipers, cooling or heater fans, etc.

One object of this invention is to provide an automobile accessory driving arrangement which is drivingly interposed between the automobile engine and the accessory to be driven, such as a windshield wiper, in such a manner that the speed at which the accessory is driven can be varied independently of the speed of the engine by a regulator under the control of the operator.

Another object is to provide a variable speed automobile accessory driving arrangement of the foregoing character wherein a clutch under the control of the operator is interposed between the power takeoff at the engine and the flexible shaft which conveys power to the variable speed mechanism by which the output speed of the arrangement is controlled by the operator, thereby causing the flexible shaft to remain idle at all times except when the accessory is actually being operated, and thus saving much power and preventing wear.

Another object is to provide a variable speed automobile accessory driving arrangement of the foregoing character wherein the variable speed mechanism may be set by the operator for a given speed, and will automatically be varied to maintain that speed as the speed of the engine rises and falls.

In the drawings:

Figure 1 is a diagrammatic front elevation of an automobile accessory driving arrangement, according to one form of the invention, as installed in an automobile and driving a windshield wiper;

Figure 2 is a fragmentary side elevation, partly in vertical section, of the forward portion of the automobile accessory driving arrangement of Figure 1, showing the power takeoff and clutching mechanism;

Figure 3 is an enlarged central vertical section through the automatic variable speed regulator taken along the line 3—3 in Figure 1; and Figure 4 is a fragmentary front elevation of the left-hand portion of the engine of Figure 1 equipped with a modified power take-off.

Hitherto, automobile accessories, such as windshield wipers or cooling or heater fans, have been driven by motors which are separate from the automobile engine, such as suction motors operated by the vacuum in the intake manifold of the engine or electric motors energized from the automobile storage battery. Vacuum or suction motors vary in speed according to the variation in suction in the manifold, and thus it often happens that at times when it is raining or snowing most heavily, the windshield wiper is operating too slowly to take care of the heavy rain or snow. An electrically driven windshield wiper of sufficient power is expensive, particularly if it is designed to develop enough power to operate under sleet conditions. Electric motors themselves are also expensive and consequently the cost of such installations is often deemed excessive by the automobile manufacturer. Furthermore, such electrically driven devices consume current and thus tend to run down the battery.

The present invention provides a driving arrangement which is operated directly from the automobile engine so that adequate power is always available, even under severe icing or sleet conditions. The mechanism is much less expensive to manufacture than electric motor-driven mechanism and is also capable of being regulated and varied as to speed, so as to adapt it to any conditions which are likely to be encountered. An automatic speed varying arrangement is also provided in addition to a manual speed regulator so that the output speed may be maintained approximately constant even though the input speed varies because of variations in the engine speed.

Referring to the drawings in detail, Figure 1 shows an automobile accessory driving arrangement, generally designated 10, according to one form of the invention, as driven from the automobile engine 11 and in turn driving an automobile accessory 12, here shown as a windshield wiper on the windshield 13 of an automobile 14 having a dash 15 (Figure 3). The automobile engine 11 is provided with the usual crankshaft 16 which by a conventional belt 17 drives the pulleys 18 and 19 on the shafts 20 and 21 of the cooling fan 22 and generator 23 respectively (Figure 1). The engine 11 also has a cam shaft 24 driven at half speed from the crankshaft 16 by conventional gearing (not shown) within the gear housing 25. The cam shaft 24 carries a helical gear 26 (Figure 4) which meshes with a similar helical gear 27 on the timer and distributor shaft 28 which drives the timer and distributor 29. All the foregoing mechanism is conventional and well-known to automobile engineers and mechanics.

Bolted or otherwise secured to the engine 11 (Figure 2) is a reduction gear set or gear box 30 which has a casing 31 with a casing boss 31a projecting in a forward direction. Journaled in the boss 31a is an input shaft 32 to the forward end of which a pulley 33 is pinned or otherwise suitably secured. Mounted on the inner or rearward end of the input shaft 32 within the gear box 30 is a pinion 34 meshing with a gear 35 on a counter-shaft 36 journaled in the side wall of the gear box 30. The counter-shaft 36 also carries a pinion 37 preferably on the same hub as the gear 35 and integral with it, so as to be driven simultaneously with the gear 35. The pinion 37 in turn meshes with a gear 38 mounted on an output shaft 39 journaled in one of the side walls of the gear box 30. Pinned or otherwise suitably secured to the outer end of the shaft 39 is a fixed jaw 40 forming one part of a clutch 41, the movable jaw 42 of which is keyed or splined to a shaft 43 journaled in a T-shaped bearing bracket 44 which extends rearwardly from the gear box 30. The movable jaw 42 is annularly grooved as at 45 to receive the pin-carrying upper end of a clutch shift lever 46.

The clutch shift lever 46 is pivotally mounted as at 47 on the bracket 44 and at its lower end is pivotally connected to a clevis 48 on the end of a flexible wire 49 forming a part of a so-called Bowden wire operator or controller 50 having a tubular flexible member 51 slidably receiving the wire 49. The flexible tubular member 51 is frequently made in the form of a spirally wound wire tube and terminates at its upper end in a sleeve 52 having a flange 53 by which it is secured to the inside surface of the dash 15 (Figure 3). The wire 49 is secured as at 54 to a stem 55 reciprocably mounted in the sleeve 52 and carrying an operating knob 56 on its outer end. Consequently, by pulling the knob 56, the consequent pull on the wire 49 rocks the lever 46 and engages the movable jaw 42 with the fixed jaw 40 of the jaw clutch 41, thus drivingly connecting the shafts 32 and 43.

At its rearward end, the shaft 43 is seated in or otherwise drivingly secured to a flexible shaft 58 which passes through a tubular cap 57 and is rotatably mounted in a flexible tube 59, this tube being also frequently formed of a spirally wound metal ribbon or strip. The upper end of the flexible shaft 58 passes through a tubular cap 60 (Figure 3) and is seated in or otherwise drivingly secured to the lower end of a shaft 61 forming a part of a variable speed unit 62. The latter has a casing 63 with bearing bosses 64 and 65 in its upper and lower ends for rotatably supporting the shaft 61.

The shaft 61 has a spline or key 66 to provide a sliding yet driving connection between it and similarly-grooved upper and lower sleeves 67 and 68 interconnected by a flyball speed governor unit, generally designated 69. The lower sleeve 68 is grooved as at 70 to receive the pin-carrying inner arm 71 of a bell crank shift lever 72 which is pivoted as at 73 on a bracket 74 extending inward from the casing 63. The outer arm 75 is similarly yoked and similarly engages an internally-threaded grooved collar 76 mounted upon a screw shaft 77. The latter is journaled as at 78 in the casing 63, passes through a hole 79 in the dash 15 and on its outer end is provided with a hand crank 80 for adjusting the output speed of the variable speed unit 62.

The upper end of the lower sleeve 68 carries a lower plate 81 upon which the lower links 82 of the flyball governor 69 are pivotally mounted, the upper ends thereof being pivotally connected to the flyball weights 83 which in turn are pivotally connected to upper links 84 pivotally mounted on an upper plate 85. The upper plate 85 is mounted on the lower end of the upper sleeve 67, and a helical spring encircling the shaft 61 urges the plates 81 and 85 apart from one another so as to pull the flyball weights 83 inward toward the shaft 61 and thereby counteract the effect of centrifugal force upon the weights 83.

Drivingly secured to the upper sleeve 67 is a friction wheel 87 which is adapted to frictionally engage a friction disc 88 pinned or otherwise drivingly secured to an output shaft 89 journaled in a bearing boss 90 in the casing 63. A helical spring 91 urges the disc 88 into frictional engagement with the friction wheel 87 which is capable of being moved axially along the shaft 61 to different positions on the disc 88 manually by means of the hand crank 80 and automatically by means of the flyball governor 69. Pinned or otherwise drivingly secured to the outer end of the shaft 89 is a crank 92. For assembly purposes, the casing 63 is provided with a lower end closure 93 which is secured as at 94 to the upper portion 95 of the casing 63. Pivotally connected as at 96 to the crank 92 is a link or connecting rod 97 which in turn is pivotally connected to the lower end of a windshield wiper lever 98, forming a part of the windshield wiper 12. As a pair of windshield wipers 12 are usually used in an ordinary automobile, these are pivotally interconnected by a tie or connecting link 99. The windshield wipers 12 are pivotally mounted on brackets 100 secured to the cowl or other portion of the automobile 14 in any suitable manner. Each of the windshield wiper levers 98 at its upper end carries the usual blade 101 pivotally mounted thereon and provided with the usual resilient edge (not shown) of rubber or other suitable material.

The modification shown in Figure 4, instead of driving the accessory driving arrangement 10 from the fan belt 17 by means of the pulley 33 (Figures 1 and 2) takes the drive off the cam shaft 24 (Figure 4) by way of the helical gears 26 and 27. For this purpose, a third helical gear 102 is mounted on a shaft 103 and in mesh with the helical gear 27 so as to be rotated by the latter. The shaft 103 is journaled in the crankcase extension 104 and is substituted for the input shaft 32 of the reduction gear set or gear box 30 and, like it, carries the pinion 34. The remainder of the modification of Figure 4 is identical with that of Figure 1.

It will be obvious that the clutch 41 (Figure 2) instead of being placed near the engine 11, may be placed near the variable speed unit 62. In the latter position, it has the advantage of greater simplicity but when so positioned, it necessitates constant rotation of the flexible shaft 58 and consequently results in greater wear. It will also be obvious that the clutch 41 may be omitted entirely and the device brought to a halt by means of a handle 80 so as to shift the friction wheel 87 into alignment with the axis of the shaft 89. This arrangement, while also simple, likewise results in greater wear on the flexible shaft 58 as well as similar wear on the flyball governor 69 and friction wheel 87, which thus rotate constantly.

In the operation of the invention, with the parts in the positions shown in Figures 2 and 3, the operator pulls the knobs 56 outward from the dash 15 in order to place the driving arrangement 62 in operation. This action shifts the movable jaw 42 of the jaw clutch 41 into engagement with the fixed jaw 40 thereof and establishes a driving connection between the output shaft 39 of the gear box 30 and the shaft 43 connected to the flexible shaft 58. As a consequence, the rotation of the engine crankshaft 16 and the consequent rotation of the pulley 33 and shaft 32 by the fan belt 17 causes the flexible shaft 58 to rotate at a reduced speed, thereby rotating the spline shaft 61 of the variable speed unit 62. If the friction wheel 87 is positioned out of alignment with the axis of rotation of the output shaft 89, the frictional engagement between the friction wheel 87 and friction disc 88 causes the latter to rotate, thereby rotating the crank 92 and reciprocating the connecting rod 97 and link 99. This consequently causes the windshield wipers 12 to sweep to and fro across the windshield 13, removing the rain or snow in the usual way.

To decrease the speed of the output shaft 89 and consequently to decrease the rate of oscillation of the windshield wiper 12, the operator rotates the hand crank 80 in a direction adapted to move the upper and lower sleeves 67 and 68 and flyball governor 69 downward along the spline shaft 61, moving the friction wheel 87 farther from the axis of rotation of the output shaft 89. Since the friction wheel 87 now engages the friction disc 88 on a greater diameter, a reduced speed of the output shaft 89 occurs for a given speed of the spline shaft 61.

If, now, the engine 11 varies in speed and consequently causes the speed of the flexible shaft 58 and spline shaft 61 to vary, the flyball governor 69 will cause the upper plate 85 and upper sleeve 67 to shift upward or downward along the spline shaft 61 in response to the varying effect of centrifugal force upon the flyweights 83. In particular, if the engine 11 and spline shaft 61 increase in speed, the centrifugal force acting on the flyball weights 83 increases, pulling them outward on their links 82 and 84 and consequently pulling the upper plate 85 downward against the urge of the compression spring 86. This pulls the friction wheel 87 downward so as to engage a longer radius or greater diameter zone of the friction disc 88, automatically reducing the speed of the output shaft 89.

On the other hand, if the speed of the motor 11 and spline shaft 61 decrease, the centrifugal force on the flyball weights 83 correspondingly decreases, whereupon the compression spring 86 overcomes the effect of the centrifugal force and pushes the upper plate 85 upward, moving the friction wheel 87 to a smaller diameter zone on the friction disc 88 and thereby increasing the speed of the output shaft 89.

Thus, the operator has the regulation of the speed of the windshield wipers 12 or other accessories directly under his control, either manually by the hand crank 80 or automatically by the flyball governor 69. It will be assumed, of course, that the friction wheel 87 and preferably also the friction disc 88 are made of materials which provide proper frictional engagement and also suitable wearing qualities. While the friction wheel and disc variable speed mechanism 62 has been selected for purposes of illustration, the invention is not limited to this particular variable speed device, but it will be understood that other conventional variable speed devices may optionally be substituted.

What I claim is:

1. A variable-speed engine-driven automobile accessory driving arrangement comprising a rotary power-transmitter, speed reducing mechanism having an input member drivingly connectible to a continuously rotating part of said engine and an output member drivingly connected to said power-transmitter, and an adjustable speed ratio variable speed transmission unit having an input element drivingly connected to said power-transmitter and an output element adapted to be drivingly connected to said accessory, said transmission unit having a manual control member operatively connected thereto and adapted to be positioned within reach of the automobile operator, said transmission unit also including an automatic speed governor connected thereto and operable independently of said manual control member to automatically hold substantially constant the speed of said output element in response to a variation in the speed of said input element.

2. A variable speed engine-driven automobile accessory driving arrangement comprising a rotary flexible shaft, speed reducing mechanism having an input member drivingly connectible to a continuously rotating part of said engine and an output member drivingly connected to said flexible shaft, and an adjustable speed ratio variable speed transmission unit having an input element drivingly connected to said flexible shaft and an output element adapted to be drivingly connected to said accessory, said transmission unit having a manual control member operatively connected thereto and adapted to be positioned within reach of the automobile operator, said transmission unit also including an automatic speed governor connected thereto and operable independently of said manual control member to automatically hold substantially constant the speed of said output element in response to a variation in the speed of said input element.

3. A variable-speed engine-driven automobile accessory driving arrangement comprising a rotary flexible shaft, speed reducing mechanism having an input member with a wheel thereon drivingly connectible to a continuously rotating part of said engine and an output member drivingly connected to said flexible shaft, and an adjustable speed ratio variable speed transmission unit having an input element drivingly connected to said flexible shaft, an adjustable speed ratio variable speed friction wheel device connected to said input element and an output element connected to said friction wheel device and adapted to be drivingly connected to said accessory, said transmission unit having a manual control member operatively connected thereto and adapted to be positioned within reach of the automobile operator.

4. A variable-speed engine-driven automobile accessory driving arrangement comprising a rotary flexible shaft, speed reducing mechanism having an input member drivingly connectible to a continuously rotating part of said engine and an output member drivingly connected to said flexible shaft, and an adjustable speed ratio variable speed transmission unit having an input element drivingly connected to said flexible shaft, a variable speed friction wheel device connected to said input element, and an output element connected to said friction wheel device and adapted to be drivingly connected to said accessory, said transmission unit having a manual control member operatively connected thereto and adapted to be positioned within reach of the automobile operator, said transmission unit also including an automatic speed governor connected thereto and operable independently of said manual control member to automatically hold substantially constant the speed of said output element in response to a variation in the speed of said input element.

WILLIAM H. BAGLEY.

References Cited in the file of this patent

UNITED STATES PATENTS

| Number | Name | Date |
| --- | --- | --- |
| 1,491,834 | Van Loozen | Apr. 29, 1924 |
| 1,771,703 | Berill | July 29, 1930 |
| 2,458,260 | Gray | Jan. 4, 1949 |

FOREIGN PATENTS

| Number | Country | Date |
| --- | --- | --- |
| 852,561 | France | Oct. 30, 1949 |